Patented May 18, 1926.

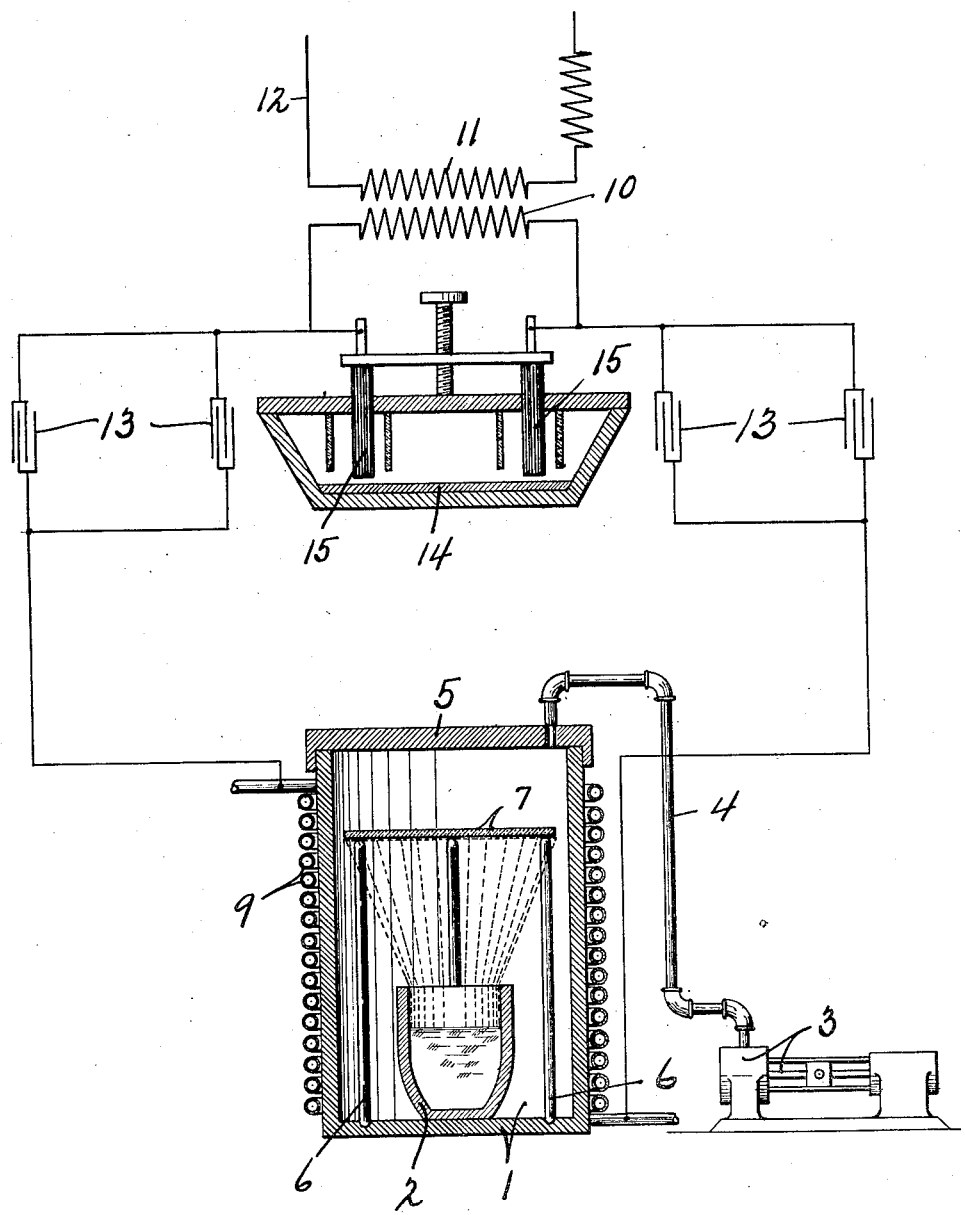

1,584,728

UNITED STATES PATENT OFFICE.

THEODORE WILLARD CASE, OF SCIPIO, NEW YORK, ASSIGNOR TO CASE RESEARCH LABORATORY INCORPORATED, OF AUBURN, NEW YORK, A CORPORATION OF NEW YORK.

METHOD OF MANUFACTURING MIRRORS.

Application filed April 18, 1922. Serial No. 555,526.

This invention relates to certain improvements in method of manufacturing mirrors, and to the novel mirror produced thereby.

Present commercial mirrors are for many reasons somewhat unsatisfactory, due partially to lack of stability and permanency and to the comparative ease of mutilation of the reflecting material and its susceptibility to cracking or peeling which destroys or partially destroys the usefulness of the mirror.

These difficulties and disadvantages perhaps become most evident under substantial variations in temperature and climatic conditions to which the mirror is subjected.

The main object of this invention is to produce a novel method of producing a mirror of great stability, permanency and reflecting power.

Other objects and advantages will appear from the following description, taken in connection with the accompanying drawings, in which:

The figure illustrates somewhat diagrammatically an apparatus suitable for carrying out my invention.

The mirror of this invention consists of or comprises a sheet or plate of glass or other suitable transparent material, and a film, layer or incorporated particles of metallic reflecting material constituting a reflecting area, such film, layer, or incorporated particles of metallic reflecting material being deposited on or incorporated or partially incorporated in the glass while the said metal is in vaporized condition in a vacuous space and in the form of minutely small particles, and while the said glass is in a dry, baked condition.

The operation of vaporizing and depositing the metallic reflecting material is carried on in a vacuous space, altho all of the gas need not be removed from said space and in certain cases an inert gas, such as argon may be introduced into such space.

Within this space or chamber the metallic material such as aluminum, gold, silver, nickel, etc. may be vaporized by the action of heat and the vaporized metal is deposited in the form of minutely small particles upon the transparent sheet, which may be supported in any suitable manner in the path of the vapor.

The apparatus for carrying out my process comprises a vacuous or evacuated chamber receptacle or bulb —1— within which the metallic material designed to constitute the reflecting surface is confined or maintained in any suitable manner, as within a pot or crucible —2—.

The air or gas may be withdrawn from chamber —1— any suitable manner to produce the desired degree of vacuum, as by means of a vacuum pump —3— connected by pipe —4— with the interior of the chamber. Preferably the chamber is provided with an opening permitting free access thereto for the insertion and removal of materials, such opening being sealed as by the removable cap —5—. Within the chamber —1— the plate, plates or pieces of glass or material to be treated is positioned, and may be supported in desired position in the direct path of vapor coming from the crucible or crucibles —2—, as for instance, by means of suitable upright posts or supports —6— of suitable material to withstand temperature and other conditions existing in the chamber.

When the parts so far described have been arranged in suitable position and the required vacuum drawn upon the chamber, the metallic material within the crucible or container —2— may be heated in any suitable manner and by any suitable means to a vaporizing temperature, such vapor in its travel from the pot meeting, contacting with, depositing on or incorporating itself in the sheet of glass or other material to be treated.

Prior to the subjection of the transparent plate or glass sheet —7— to the treatment described, it is quite essential that it should be subjected to a baking process, as for instance, to a temperature of four or five hundred degrees Fahrenheit for a period of thirty minutes or more, in order to remove from the glass or particularly the surface portion thereof to be treated, practically all water or moisture. The result of this preliminary baking treatment seems to be that the depositing metal physically relates itself to the glass in a more intimate and closely coherent film, and altho the theory of the action which results in the remarkable stability and permanency of the reflecting film or incorporated layer of metallic material is more or less a matter of intelligent speculation, and the applicant hesitates to state positively any definite theory and desires to confine himself to the known facts of the improved characteristics of the mirror, yet with this reservation, the applicant suggests that the vaporized metallic material in the form of minutely, sub-divided particles takes the place to a certain extent at least, of the water or moisture removed from the glass or the surface portions thereof by the baking process described, and that by incorporating itself into the glass and the material thereof to form a hard, stable and substantially permanent reflecting area.

The heating of the metallic material within the vacuum chamber —1— is preferably, and most effectively accomplished by the use of a high frequency induction current utilizing generally the known Ajax-Northrup electric furnace, which comprises a single layer solenoid —9— surrounding the chamber —1— or required portions thereof and connected in circuit with the secondary —10— of a transformer, the primary —11— of which receives its current from the line —12—, the said circuit embodying condensers —13— and a high frequency spark gap or gaps between mercury —14— and carbon points —15— suitably connected in the circuit in the usual and well known manner.

Generally speaking, the metallic material within the crucible —2— attains a high temperature due to eddy currents induced in it by the high frequency electric current carried by the solenoid —9— while the solenoid may itself be maintained in cool condition by forming it of a hollow conductor through which cooling fluid may flow.

The furnace portion of the apparatus is known and need not be further described, but by reason of its peculiar relation and efficiency in the vaporizing of a metal in a vacuum chamber for depositing said metal in vaporized minutely sub-divided condition upon a surface to be treated, it constitutes an element of a closely related novel combination for effecting the results described.

Altho I have shown and described a specific apparatus as constituting a preferred embodiment of structure for carrying out the process of my invention and producing the product thereof, I do not desire to limit myself to the details of the apparatus or to particular individual elements thereof, or to the details of the process except where the same may be specifically set forth in the claims hereto appended.

I claim:

1. The method of manufacturing a mirror comprising removing water and vapor from the surface of a glass piece by baking and then depositing a metallic material in vaporized form upon the baked surface of the glass piece to form a thin coherent reflecting film thereon.

2. The method of manufacturing a mirror comprising subjecting a piece of glass to a temperature approximating 400 deg. or more for a period of about forty minutes to thereby remove water and vapor from the surface of the glass, and then depositing a metal while in vaporized form in a vacuous space upon the surface of the piece of glass to form a thin reflecting film thereon.

3. The method of manufacturing a mirror comprising removing the water and moisture from the surface of a piece of glass by baking and then depositing a vaporized metal in a vacuous space upon a surface of the piece of glass to form a thin reflecting film.

In witness whereof I have hereunto set my hand this 14th day of April 1922.

THEODORE WILLARD CASE.